(12) United States Patent
Kobayashi

(10) Patent No.: US 12,651,398 B2
(45) Date of Patent: Jun. 9, 2026

(54) IMAGE PROCESSING APPARATUS, IMAGE PROCESSING METHOD, NON-TRANSITORY COMPUTER-READABLE STORAGE MEDIUM FOR OBTAINING AN AMOUNT OF SHAKE IN AN IMAGE

(71) Applicant: CANON KABUSHIKI KAISHA, Tokyo (JP)

(72) Inventor: Masaaki Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 197 days.

(21) Appl. No.: 18/407,912

(22) Filed: Jan. 9, 2024

(65) Prior Publication Data

US 2024/0233234 A1 Jul. 11, 2024

(30) Foreign Application Priority Data

Jan. 10, 2023 (JP) ................................. 2023-001916

(51) Int. Cl.
| | |
|---|---|
| *G06T 15/00* | (2011.01) |
| *G06T 7/20* | (2017.01) |
| *G06V 10/44* | (2022.01) |
| *H04N 13/106* | (2018.01) |
| *H04N 13/00* | (2018.01) |

(52) U.S. Cl.
CPC ................ *G06T 15/00* (2013.01); *G06T 7/20* (2013.01); *G06V 10/44* (2022.01); *H04N 13/106* (2018.05); *H04N 2013/0081* (2013.01)

(58) Field of Classification Search
CPC .......... G06T 15/00; G06T 7/20; G06V 10/44; H04N 13/106; H04N 2013/0081; H04N 23/6815
See application file for complete search history.

(56) References Cited

U.S. PATENT DOCUMENTS

2010/0328427 A1* 12/2010 Sakano ................... G06T 7/593
348/43
2014/0043447 A1* 2/2014 Huang ................. H04N 13/246
348/51

FOREIGN PATENT DOCUMENTS

JP 2005318568 A 11/2005

OTHER PUBLICATIONS

Wedel et al.—"Stereoscopic Scene Flow Computation for 3D Motion Understanding", 2011. (Year: 2011).*

(Continued)

*Primary Examiner* — Daniel F Hajnik
*Assistant Examiner* — Adeel Bash
(74) *Attorney, Agent, or Firm* — Canon U.S.A., Inc. IP Division

(57) ABSTRACT

An apparatus includes first, second, and third units. The first unit is configured to obtain a first three-dimensional point based on an initial start point of a motion vector in one image of a stereo image and a point corresponding to the initial start point in the other image of the stereo image. The second unit is configured to obtain a second three-dimensional point based on an initial end point of the motion vector in the one image and a point corresponding to the initial end point in the other image. The third unit is configured to obtain, based on the first and second three-dimensional points, a third three-dimensional point for which a camerawork motion component has been removed from the second three-dimensional point and obtain, based on the third and first three-dimensional points, an amount of shake in the stereo image.

12 Claims, 5 Drawing Sheets

(56) References Cited

OTHER PUBLICATIONS

Arun, Huang & Blostein—"Least-Squares Fitting of Two 3-D Point Sets", 1987. (Year: 1987).*
Howard—"Real-Time Stereo Visual Odometry for Autonomous Ground Vehicles", 2008. (Year: 2008).*
Holzmann et al., Fraundorfer & Bischof—"Direct Stereo Visual Odometry Based on Lines", 2016. (Year: 2016).*

* cited by examiner

F I G. 1
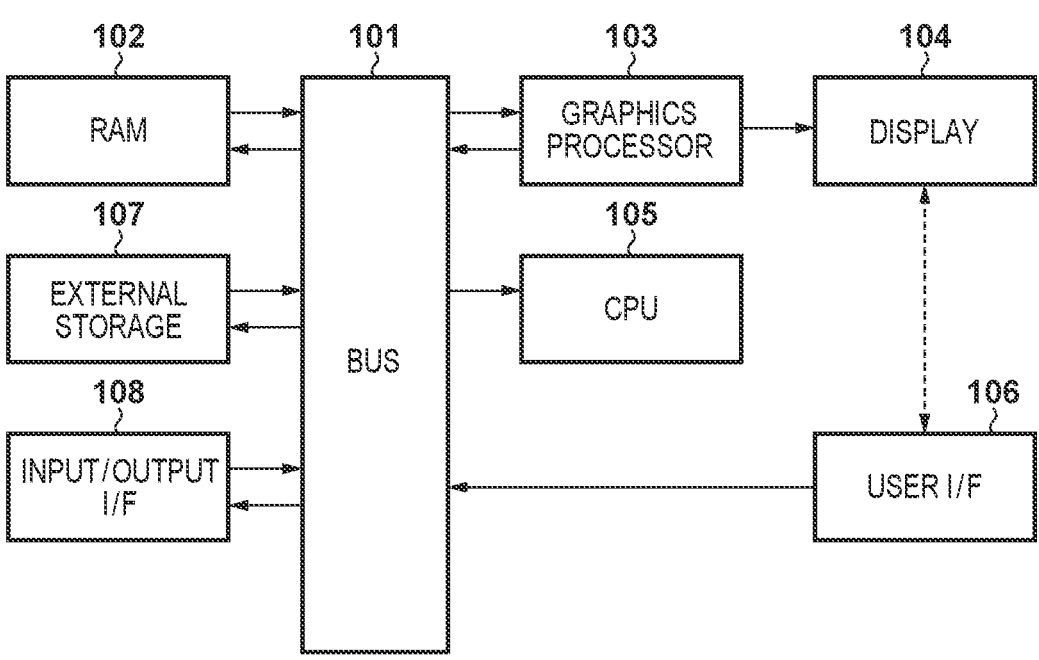

F I G.  2
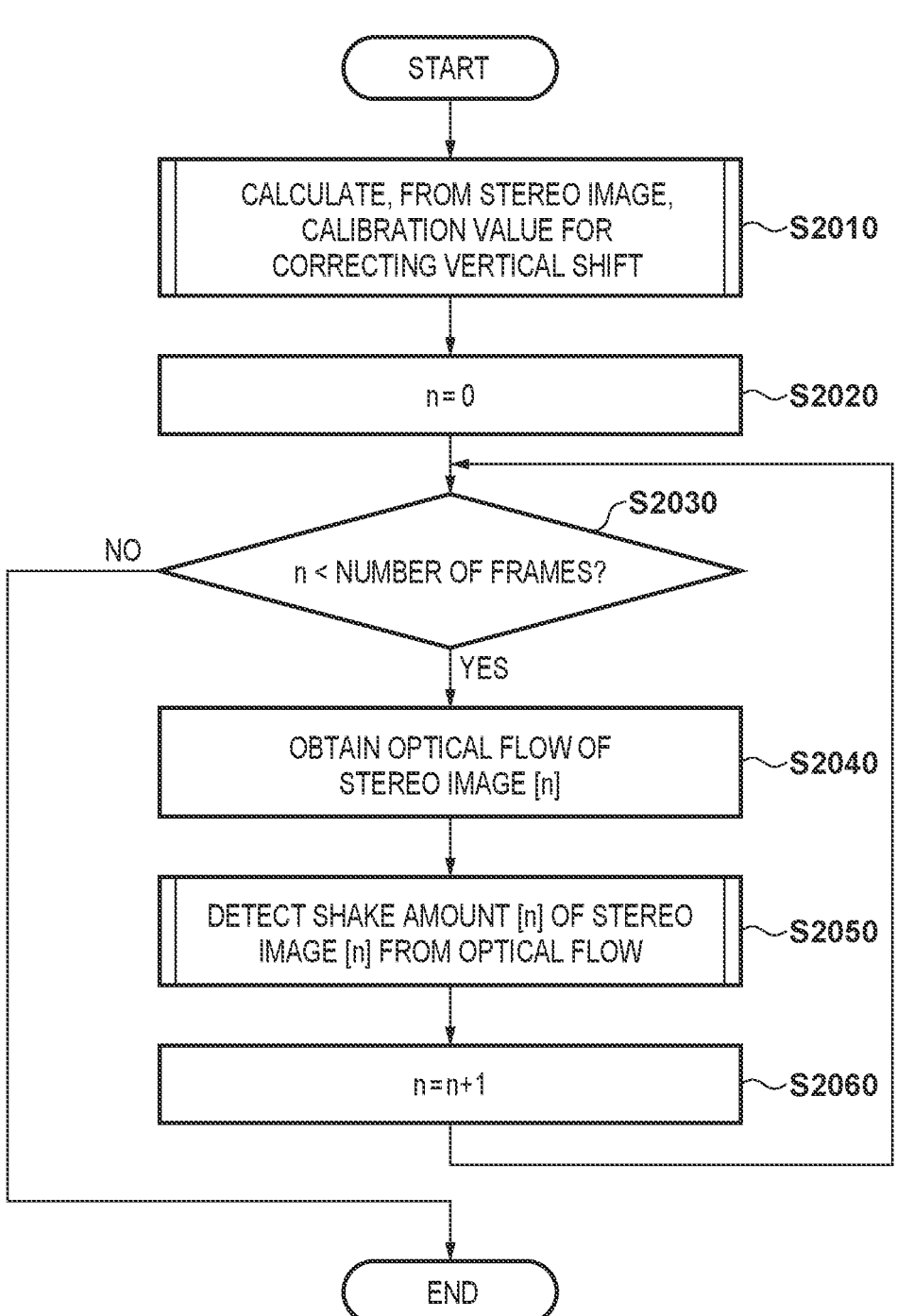

F I G.  3
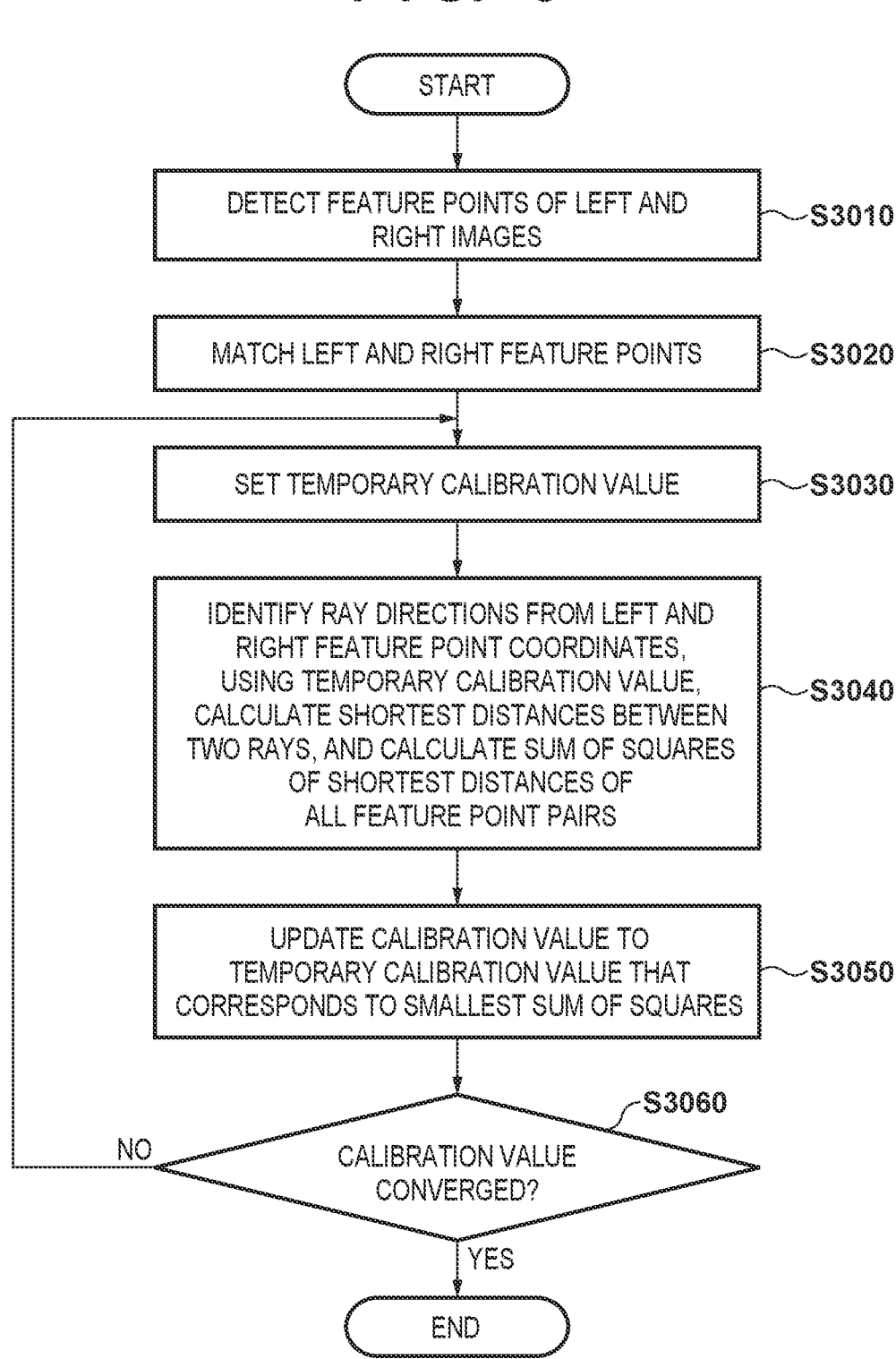

F I G.  4
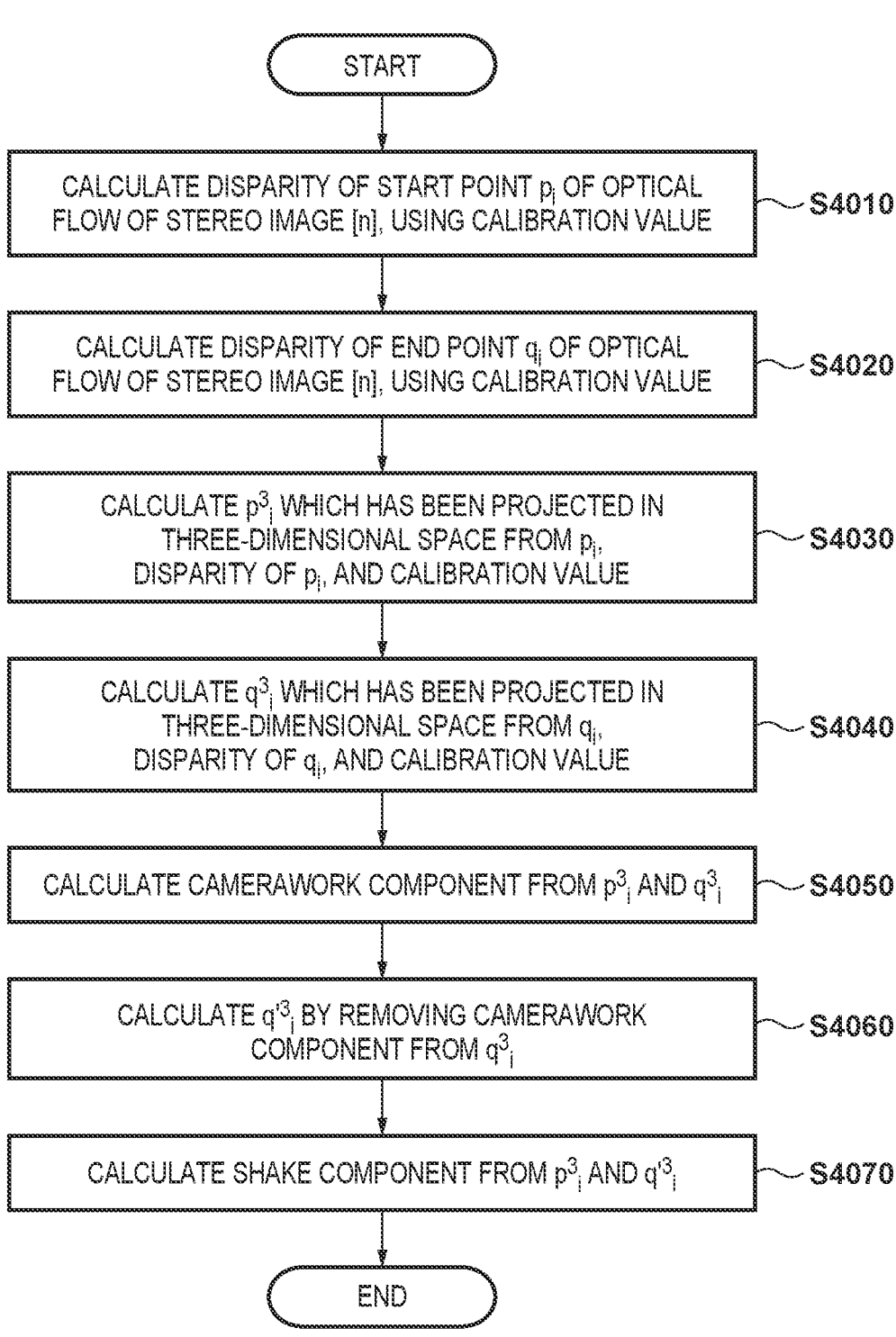

START

CALCULATE DISPARITY OF START POINT $p_i$ OF
OPTICAL FLOW OF STEREO IMAGE [n],
USING CALIBRATION VALUE          ~S5010

CALCULATE DISPARITY OF END POINT $q_i$ OF
OPTICAL FLOW OF STEREO IMAGE [n],
USING CALIBRATION VALUE          ~S5020

CALCULATE SHAKE COMPONENT FROM
MOTION FOR WHICH DISPARITY IS 0 FOR
BOTH $p_i$ AND $q_i$          ~S5030

END

IMAGE PROCESSING APPARATUS, IMAGE PROCESSING METHOD, NON-TRANSITORY COMPUTER-READABLE STORAGE MEDIUM FOR OBTAINING AN AMOUNT OF SHAKE IN AN IMAGE

BACKGROUND

Technical Field

One disclosed aspect of the embodiments relates to a technique for obtaining an amount of shake in a stereo image.

Description of the Related Art

In image processing for moving images, image stabilization (camera shake correction) is an important element for improving image quality. Image stabilization includes shake detection and image correction. In the former, a shake amount is estimated from a result of measurement by a gyro sensor or the like or from an optical flow of the image. In the latter, a shake-corrected image is obtained by performing digital geometric correction so as to cancel the shake of an image that has already been captured or by reducing the shake by physically moving the lenses or sensor based on the obtained shake amount so as to capture an image for which the shake has been canceled. Although image stabilization is often performed in cameras during image capturing, digital geometric correction is sometimes performed as one process in the course of editing and processing recorded content on a personal computer (PC) or the like.

An optical flow is a vector field that is obtained by detecting motion vectors (movement amounts of pixels) from temporally successive image frames. A motion vector is expressed by the coordinates of start and end points, or start point coordinates and a two-dimensional vector.

Conventionally, when detecting an optical flow from an image and estimating shake that is caused by vibration, if there is camerawork, such as forward movement, it is difficult to separate the camerawork and the shake from the optical flow, and thus, the accuracy of shake estimation would sometimes be reduced.

SUMMARY

One aspect of the embodiments provides a technique for obtaining an amount of shake in a stereo image with high accuracy.

According to the first aspect, an image processing apparatus includes a first obtaining unit, a second obtaining unit, and a third obtaining unit. The first obtaining unit is configured to obtain, based on a start point of a motion vector in one image of a stereo image and a point that corresponds to that start point in the other image of the stereo image, a first three-dimensional point that corresponds to that start point. The second obtaining unit is configured to obtain, based on an end point of the motion vector in the one image and a point that corresponds to that end point in the other image, a second three-dimensional point that corresponds to that end point. The third obtaining unit is configured to obtain, based on the first three-dimensional point and the second three-dimensional point, a third three-dimensional point for which a camerawork motion component has been removed from the second three-dimensional point and obtain, based on the third three-dimensional point and the first three-dimensional point, an amount of shake in the stereo image.

According to the second aspect, an image processing apparatus includes a first obtaining unit and a second obtaining unit. The first obtaining unit is configured to obtain, based on a first disparity that is based on an initial start point of a motion vector in one image of a stereo image and a point that corresponds to the initial start point in the other image of that stereo image and a second disparity that is based on an initial end point of the motion vector in the one image and a point that corresponds to the initial end point in the other image, a final start point and a final end point. The second obtaining unit is configured to obtain, based on the final start point and the final end point, an amount of shake in the stereo image.

According to the third aspect, an image processing method performed by an image processing apparatus includes obtaining a first three-dimensional point, obtaining a second three-dimensional point, obtaining a third three-dimensional point, and obtaining an amount of shake in the stereo image. The obtaining of the first three-dimensional point is based on a start point of a motion vector in one image of a stereo image and a point that corresponds to the start point in the other image of the stereo image. The first three-dimensional point that corresponds to the start point. The obtaining of the second three-dimensional point is based on an end point of the motion vector in the one image and a point that corresponds to that end point in the other image. The second three-dimensional point that corresponds to the end point. The obtaining of the third three-dimensional point is based on the first three-dimensional point and the second three-dimensional point. The third three-dimensional point is one for which a camerawork motion component has been removed from the second three-dimensional point. The obtaining of the amount of shake in the stereo image is based on the third three-dimensional point and the first three-dimensional point.

According to the fourth aspect, an image processing method performed by an image processing apparatus includes obtaining a final start point and a final end point and obtaining an amount of shake in a stereo image. The obtaining of the final start point and the final end point is based on a first disparity that is based on an initial start point of a motion vector in one image of the stereo image and a point that corresponds to the initial start point in the other image of that stereo image and a second disparity that is based on an initial end point of the motion vector in one image and a point that corresponds to the initial end point in the other image. The obtaining of the amount of shake in the stereo image is based on the obtained initial start point and initial end point.

According to the fifth aspect, a non-transitory computer-readable storage medium stores a computer program for causing a computer to function as a first obtaining unit, a second obtaining unit, and a third obtaining unit. The first obtaining unit is configured to obtain, based on a start point of a motion vector in one image of a stereo image and a point that corresponds to that start point in the other image of the stereo image, a first three-dimensional point that corresponds to that start point. The second obtaining unit is configured to obtain, based on an end point of the motion vector in the one image and a point that corresponds to that end point in the other image, a second three-dimensional point that corresponds to that end point. The third obtaining unit is configured to obtain, based on the first three-dimensional point and the second three-dimensional point, a third three-dimensional point for which a camerawork motion component has been removed from the second three-dimensional point and obtain, based on the third three-dimensional point and the first three-dimensional point, an amount of shake in the stereo image.

According to the sixth aspect, a non-transitory computer-readable storage medium stores a computer program for causing a computer to function as a first obtaining unit and a second obtaining unit. The first obtaining unit is configured to obtain, based on a first disparity that is based on an initial start point of a motion vector in one image of a stereo image and a point that corresponds to the initial start point in the other image of that stereo image and a second disparity that is based on an initial end point of the motion vector in one image and a point that corresponds to the initial end point in the other image, a final start point and a final end point. The second obtaining unit is configured to obtain, based on the final start point and the final end point that have been obtained by the first obtaining unit, an amount of shake in the stereo image.

Further features of the disclosure will become apparent from the following description of exemplary embodiments with reference to the attached drawings.

BRIEF DESCRIPTION OF THE DRAWINGS

FIG. 1 is a block diagram illustrating an example of a hardware configuration of an image processing apparatus.

FIG. 2 is a flowchart of a process to be performed by the image processing apparatus to obtain an amount of shake in a stereo image.

FIG. 3 is a flowchart for explaining details of a process in step S2010.

FIG. 4 is a flowchart for explaining details of a process in step S2050.

DESCRIPTION OF THE EMBODIMENTS

Figure 5:
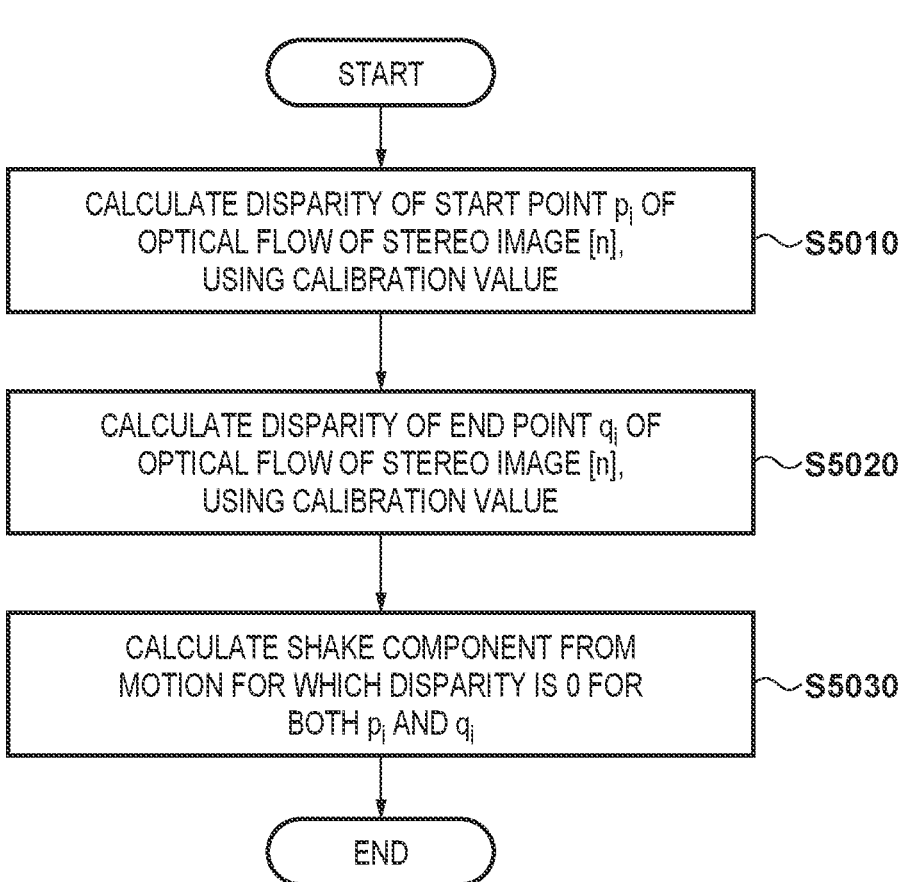
FIG. 5 is a flowchart for explaining details of a process in step S2050.

Hereinafter, embodiments will be described in detail with reference to the attached drawings. Note, the following embodiments are not intended to limit the scope of the claimed embodiments. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

First, an example of a hardware configuration of an image processing apparatus according to the present embodiment will be described with reference to a block diagram of FIG. 1. The image processing apparatus according to the present embodiment may be, for example, a computer apparatus, such as a personal computer (PC), a smartphone, or a tablet terminal apparatus. The image processing apparatus according to the present embodiment may be an embedded circuit of an image capturing apparatus that includes an image capturing unit that captures a moving image (hereinafter referred to as a stereo moving image), each of whose frames is a stereo image. The image processing apparatus according to the present embodiment may be an embedded circuit of a device that requires a function of calculating an amount of shake in a stereo moving image.

A Central Processing Unit (CPU) 105 executes various kinds of processing using computer programs and data that are stored in a Random Access memory (RAM) 102. The CPU 105 thus controls the operation of the entire image processing apparatus and executes or controls various kinds of processing, which will be described as processes or units to be performed by the image processing apparatus.

The RAM 102 includes an area for storing computer programs and data that have been loaded from an external storage 107 and an area for storing data that has been received from the outside via an input/output I/F 108. The RAM 102 includes a work area that the CPU 105 and a graphics processor 103 use when executing various kinds of processing. The RAM 102 can thus provide various kinds of areas as appropriate.

The external storage 107 is a non-volatile mass information storage device, such as a hard disk drive device or a solid-state drive (SSD) that uses flash memory. The external storage 107 stores an operating system (OS); computer programs and data for causing the CPU 105 or the graphics processor 103 to execute or control various kinds of processing, which will be described as processes to be performed by the image processing apparatus; and the like. The computer programs and data that are stored in the external storage 107 are loaded into the RAM 102 as appropriate according to control by the CPU 105 and are set to be processed by the CPU 105.

The input/output I/F 108 is an interface for performing data communication (data transmission and reception) with an external apparatus. For example, the input/output I/F 108 may be an interface for connecting to a wireless/wired network, such as a LAN or the Internet, or may be an interface for connecting an apparatus that is capable of providing moving/still images.

The graphics processor 103 is a processor that executes various kinds of processing for displaying images and text on a display 104. For example, the graphics processor 103 decodes a coded image or text and displays it on the display 104 or performs processing, such as image processing, on images and text to be displayed.

The display 104 is a display device that includes a liquid crystal screen and displays results of processing by the CPU 105 and the graphics processor 103, using images, text, and the like. A user I/F 106 is a user interface, such as a keyboard, a mouse, and a touch panel, and by operating it, the user can input various kinds of instructions to the CPU 105. The user I/F 106 may form a touch panel screen by being integrated with the display 104.

The RAM 102, the external storage 107, the input/output I/F 108, the graphics processor 103, the CPU 105, and the user I/F 106 are all connected to a bus 101.

The hardware configuration that is illustrated in FIG. 1 is only one example of a hardware configuration that is applicable to the image processing apparatus according to the present embodiment and can be appropriately modified or changed. For example, although there is one CPU 105 in FIG. 1, a plurality of CPUs 105 may be provided. In such a case, the image processing apparatus allows parallel operation by multi-threaded processing.

The image processing apparatus according to the present embodiment obtains an amount of shake in a stereo image, which is a respective frame of a stereo moving image. The stereo image is a set of a captured image (left image) of one side (left) and a captured image (right image) of the other side (right) and is, for example, a stereo fisheye image. In the present embodiment, a case where the stereo image is a set of a left "180-degree field-of-view fisheye image according to equidistant projection" and a right "180-degree field-of-view fisheye image according to equidistant projection" will be described. Further, in the present embodiment, both the left image and the right image are assumed to be RGB images in which each pixel has RGB values but are not limited thereto and, for example, may be YUV images or monochrome luminance images. In the following description, images for obtaining motion vectors are assumed to be luminance images in which each pixel has a luminance value, and in a case where the images are not luminance images, the image processing apparatus will use the images to calculate motion vectors and the like, having converted them into luminance images. Further, if the stereo moving image is encoded, the image processing apparatus will decode the encoded stereo moving image using the graphics processor 103 and set the decoded stereo moving image as the target of the following process.

The process to be performed by the image processing apparatus according to the present embodiment to obtain an amount of shake in a stereo image will be described according to the flowchart of FIG. 2. By the time the process of step S2010 begins, the CPU 105 has loaded a stereo moving image into the RAM 102. The method of loading a stereo moving image into the RAM 102 is not limited to a particular loading method. For example, the CPU 105 may load a stereo moving image that is stored in the external storage 107 into the RAM 102. The CPU 105 may also load a stereo image of each frame that is transmitted from an "image capturing apparatus for capturing a stereo moving image" that is connected to the input/output I/F 108 into the RAM 102 via the input/output I/F 108.

In step S2010, the CPU 105 obtains, from the stereo image, a calibration value for correcting a vertical shift (shift in a vertical direction). In the present embodiment, the CPU 105 obtains the calibration value using the first stereo image of the stereo moving image. Details of the process of step S2010 will be described later.

In step S2020, the CPU 105 initializes the value of a variable n, which indicates the number of a frame in the stereo moving image (the frame number of the first frame is 0), to 0. In step S2030, the CPU 105 determines whether the value of the variable n is smaller than the "total number of frames in the stereo moving image". If the result of the determination is that the value of the variable n is smaller than the "total number of frames in the stereo moving image", the process proceeds to step S2040. Meanwhile, if the value of the variable n is equal to the "total number of frames in the stereo moving image", the process that follows the flowchart of FIG. 2 ends.

In step S2040, the CPU 105 obtains the optical flow of a stereo image [n]. The "stereo image [n]" represents the stereo image of an n-th frame in a stereo moving image.

First, the CPU 105 performs Oriented FAST and Rotated BRIEF (ORB)-based feature point detection and matching processing on the left image (left image [n]) of the stereo image [n], and the left image (left image [n+1]) of a stereo image [n+1].

The CPU 105 thus detects a plurality of feature points from each of the left image [n] and the left image [n+1] and finds feature point pairs for which ORB feature Hamming distance is the smallest between the plurality of feature points that have been detected in the left image [n] and the plurality of feature points that have been detected in the left image [n+1]. That is, for each pair, the CPU 105 can obtain, as a "motion vector that corresponds to that pair", a vector for which the start point is a "feature point that has been detected in the left image [n]" of that pair and the end point is a "feature point that has been detected in the left image [n+1]" of that pair. The CPU 105 obtains a set of motion vectors (group of motion vectors), which have been obtained for the respective pairs, as the optical flow of the stereo image [n]. These start and end points may be referred to as initial start point and initial end point.

In step S2050, the CPU 105 obtains the shake amount (shake amount [n]) of the stereo image [n] from the "optical flow of the stereo image [n]" that has been obtained in step S2040. Details of the process of step S2050 will be described later. In step S2060, the CPU 105 increments the value of the variable n by one. Then, the process proceeds to step S2030.

Next, the details of the process in the above-described step S2010 will be described according to a flowchart of FIG. 3. In step S3010, the CPU 105 detects a plurality of feature points from each of the left image (first left image) and the right image (first right image) of the stereo image of the first frame in the stereo moving image by performing ORB-based feature point detection on each of the first left image and the first right image.

In step S3020, the CPU 105 forms corresponding feature point pairs between the plurality of feature points that have been detected in the first left image and the plurality of feature points that have been detected in the first right image. For example, the CPU 105 forms a pair of a feature point of interest of the first left image and a feature point for which ORB feature Hamming distance from the feature point of interest is the smallest among the plurality of feature points that have been detected in the first right image.

In step S3030, the CPU 105 sets a temporary calibration value. In the present embodiment, calibration value components are assumed to be left and right horizontal and vertical tilt with respect to the optical axis and horizontal and vertical offsets. Different temporary calibration values are set one after another such that the calibration value converges in the form of a so-called iterative calculation each time step S3030 is executed. Although methods of converging a value by iterative calculation include a steepest descent method, a Newton method, a Levenberg-Marquardt method, and the like, assume that the Levenberg-Marquardt method is used. The CPU 105 may generate a random value each time step S3030 is executed and set it as a temporary calibration value. As described above, the method of setting a temporary calibration value in step S3030 is not limited to a particular setting method.

In step S3040, the CPU 105 identifies ray directions, each from the coordinates of a feature point of the first left image and the coordinates of a feature point of the first right image, using the temporary calibration value that has been set in step S3030; calculates shortest distances between two rays; and obtains a sum of squares of the shortest distances of all the feature point pairs. An XY coordinate system of an ideal equidistant projection fisheye image that is not distorted and does not need calibration can easily be transformed into polar coordinates. In the present embodiment, assume that distortion is removed from the XY coordinate system and the tilt with respect to the optical axis and the offset shift, which are the temporary calibration value, are taken into account in the XY coordinate system and the XY coordinate is transformed into polar coordinates. The polar coordinates correspond directly to ray direction. If the calibration value is correct, the rays of corresponding feature point pairs will intersect (come infinitely close to each other).

In step S3050, if the sum of squares that has been obtained in step S3040 this time is smaller than a smallest value Smin of the sums of squares that have been obtained in step S3040 thus far, the CPU 105 updates the calibration value to the temporary calibration value that has been set in step S3030 this time and updates the smallest value Smin to the sum of squares that has been obtained in step S3040 this time. Meanwhile, if the sum of squares that has been obtained in step S3040 this time is greater than or equal to the smallest value Smin of the sums of squares that have been obtained in step S3040 thus far, the CPU 105 does not update the calibration value or the smallest value Smin.

In step S3060, the CPU 105 determines whether the calibration value has converged. There are various methods for determining whether the calibration value has converged, and limitation is not made to a specific method.

As a result of the determination, if it is determined that the calibration value has converged, the process proceeds to step S2020. Meanwhile, if it is determined that the calibration value has not converged, the process proceeds to step S3030.

The calibration value from the time at which the process of step S2010 (process that follows the flowchart of FIG. 3) is completed is used in the following process. By projecting coordinates and images using such a calibration value, a vertical shift of the same subject between the left image and the right image is reduced, and thus, the effect of stereo rectification is achieved.

Next, the details of the process in the above-described step S2050 will be described according to a flowchart of FIG. 4. In step S4010, the CPU 105 sets a patch pt1, which is centered at a position in the "left image of the stereo image [n]" that corresponds to the "position of a start point pi of an i-th motion vector" in the optical flow (set of motion vectors) of the stereo image [n]. The CPU 105 calculates a BRIEF feature from the set patch pt1 and searches for a "patch pt2, which includes a BRIEF feature that is the most similar to the BRIEF feature" from the right image of the stereo image [n], horizontally along the image. The search is performed in a space in which the calibration value has been reflected. The CPU 105 then obtains as a disparity a horizontal shift between the center position of the patch pt1 and the center position of the found patch pt2. Assume that count is the number of motion vectors that are included in the optical flow (set of motion vectors). At this time, by performing such a process for i=1 to count, the CPU 105 can obtain a start point disparity for each motion vector that is included in the optical flow (set of motion vectors).

In step S4020, the CPU 105 sets a patch pt3, which is centered at a position in the "left image of the stereo image [n]" that corresponds to the "position of an end point qi of the i-th motion vector" in the optical flow (set of motion vectors) of the stereo image [n]. The CPU 105 calculates a BRIEF feature from the set patch pt3 and searches for a "patch pt4, which includes a BRIEF feature that is the most similar to the BRIEF feature" from the right image of the stereo image [n], horizontally in the image. The search is performed in a space in which the calibration value has been reflected. The CPU 105 then obtains as a disparity a horizontal shift between the center position of the patch pt3 and the center position of the found patch pt4. At this time, by performing such a process for i=1 to count, the CPU 105 can obtain an end point disparity for each motion vector that is included in the optical flow (set of motion vectors).

In step S4030, the CPU 105 obtains a projected start point $p^3i$ (three-dimensional point), for which the start point pi has been projected in a three-dimensional space, using the start point pi, the disparity of the start point pi, and the calibration value. The projection of stereo images from XY coordinates to three-dimensional space coordinates is a known technique, and thus, description will be omitted. By performing such a process for i=1 to count, the CPU 105 obtains a projected start point that corresponds to a respective start point. The projected start point may be referred to as the final start point.

In step S4040, the CPU 105 obtains a projected end point $q^3i$ (three-dimensional point), for which the end point qi has been projected in a three-dimensional space, using the end point qi, the disparity of the end point qi, and the calibration value. By performing such a process for i=1 to count, the CPU 105 obtains a projected end point that corresponds to a respective end point. The projected end point may be referred to as the final end point.

In step S4050, the CPU 105 obtains a motion component (camerawork component) w of the camerawork (camerawork of a camera that has captured the stereo moving image), using the projected start point $p^3i$ and the projected end point $q^3i$. In the present embodiment, assume that an optical axis direction is the z-axis, the vertical direction of the image is the y-axis, the horizontal direction of the image is the x-axis, a camerawork motion component is w, and the camerawork is limited to a component that is a forward movement in the optical axis direction. In such a case, the CPU 105 obtains the camerawork motion component w according to the following Equations (1) to (3).

$$q_i^3 = \begin{pmatrix} q_i^x \\ q_i^y \\ q_i^z \end{pmatrix} \tag{1}$$

$$p_i^3 = \begin{pmatrix} p_i^x \\ p_i^y \\ p_i^z \end{pmatrix} \tag{2}$$

$$w = \begin{pmatrix} 0 \\ 0 \\ q_i^z - p_i^z \end{pmatrix} \tag{3}$$

In step S4060, the CPU 105 obtains a corrected projected end point $q'^3i$ for which the camerawork motion component w has been removed from the projected end point $q^3i$ according to the following Equation (4).

$$q_i'^3 = q_i^3 - w = \begin{pmatrix} q_i^x \\ q_i^y \\ p_i^z \end{pmatrix} \tag{4}$$

By performing the process of steps S4050 and S4060 for i=1 to count, the CPU 105 can obtain a corrected projected end point that corresponds a respective projected end point.

In step S4070, for i=1 to count, the CPU 105 normalizes each of the projected start point $p^3i$ and the corrected projected end point $q'^3i$ to a vector with a magnitude of 1. The three-dimensional point p={px, py, pz} is normalized according to the following Equation (5).

$$norm(p) = norm\left(\begin{pmatrix} p^x \\ p^y \\ p^z \end{pmatrix}\right) = \frac{1}{\sqrt{(p^x)^2 + (p^y)^2 + (p^z)^2}} \begin{pmatrix} p^x \\ p^y \\ p^z \end{pmatrix} \tag{5}$$

Here, norm(p) is a function that projects (transforms) the three-dimensional orthogonal coordinates (x, y, z) of a three-dimensional point onto coordinates on a spherical surface (into polar coordinates) with a radius of 1. In addition, the CPU 105 sets values respectively for pan (p), tilt (t), and roll (r), which are shake amount components (shake components), and forms a matrix (parameter) M, which is illustrated in the following Equation (6), using the pan (p), tilt (t), and roll (r) for which the values have been set.

$$M = \left( \begin{pmatrix} \cos(r) & -\sin(r) & 0 \\ \sin(r) & \cos(r) & 0 \\ 0 & 0 & 1 \end{pmatrix} \begin{pmatrix} 1 & 0 & 0 \\ 0 & \cos(t) & -\sin(t) \\ 0 & \sin(t) & \cos(t) \end{pmatrix} \begin{pmatrix} \cos(p) & 0 & \sin(p) \\ 0 & 1 & 0 \\ -\sin(p) & 0 & \cos(p) \end{pmatrix} \right)^t \quad (6)$$

$$e = \underset{M}{\operatorname{argmin}} \sum_{i=1}^{count} \left| norm(p_i^3) - M \cdot norm(q_i'^3) \right|^2 \quad (7)$$

The CPU 105 generates a plurality of matrices M while replacing the values that are set respectively for pan (p), tilt (t), and roll (r). The values that are set respectively for pan (p), tilt (t), and roll (r) may be set at randomly for each matrix M, or the values that have been registered for each matrix M in a list that has been created in advance may be read out sequentially and set to the matrix M, and the disclosure is not limited to a specific setting method.

The CPU 105 then outputs, as a matrix e, a matrix M that minimizes a "value for which a difference between a result of normalizing the projected start point $p^3i$ and a normalized result for which a result of normalizing the corrected projected end point $q'^3i$ has been transformed by the matrix M has been added up for i=1 to count" (sum) among the plurality of generated matrices M, according to Equation (7). The CPU 105 can thus identify, as the matrix e, the matrix M that minimizes the sum. Here, as a result, the CPU 105 can obtain the pan (p), tilt (t), and roll (r) that has been set to form the identified matrix M (matrix e) as components of the shake amount of the stereo image [n] (pan, tilt, and roll movements caused by the vibration of the camera from the stereo image [n] to the stereo image [n+1]).

Specifically, the shake amount can be obtained by setting maximum values of anticipated pan (p), tilt (t), and roll (r) and performing iterative calculation. Regarding iterative calculation, although there are the steepest descent method, the Newton method, the Levenberg-Marquardt method, and the like as described for the calculation of the calibration value, assume that the Levenberg-Marquardt method is used in the present embodiment.

As described above, according to the present embodiment, a disparity between the left image and the right image is calculated for each of the start point and the end point of a motion vector, each of the start point and the end point is projected onto a three-dimensional space using that disparity, and the camerawork component is removed from the end point coordinates in a three-dimensional space coordinate system. This makes it possible to efficiently calculate a shake component that is not affected by camerawork.

Further, even when a shift occurs in the optical system due to heat or deterioration over time, by calculating the calibration value each time using an inputted image, it is possible to perform projection in a three-dimensional space more correctly, thereby suppressing a decrease in the accuracy of shake detection. This means that it is unnecessary for the user to capture an image of a calibration chart and manually calculate the calibration value, each time.

In the present embodiment, an example in which correction is performed using the calibration value at the time of coordinate transformation has been described; however, the image itself may be corrected. By detecting a motion vector from the corrected image, the accuracy of motion vector detection is improved.

The image processing apparatus can also generate a stabilized image by obtaining a movement average for each shake component of the shake amount and geometrically correcting the stereo image based on a difference between a shake component of the shake amount that has been obtained for the current frame and a corresponding movement average.

Further, in the present embodiment, a fisheye image is inputted; thus, by stabilizing the left image and the right image and converting them into an equirectangular image, it is also possible to generate an image for virtual reality (VR) display. Further, if stereo display is not necessary, only the left image, for example, need be outputted.

In the present embodiment, the image has been described as being a fisheye image (equidistant projection) but is not limited thereto and, for example, may be a normal lens image (central projection image). Further, in the present embodiment, a motion vector is obtained using the ORB method; however, the method for obtaining a motion vector is not limited to a particular method, and another feature point detection and matching method, such as a SIFT method, may be applied, or template matching may be used. In the present embodiment, an example in which fisheye images with varying distortions are inputted has been described; thus, the ORB method in which matching that uses feature calculation, which is robust against distortion, is performed is useful; however, in the case of a central projection image, distortion is small, and thus, template matching is sufficient.

Further, association of the start and end points of a motion vector in each of the left and right images of the present embodiment has been performed using BRIEF features; however, the disclosure is not limited to this, and other features, such as SIFT, may be used, or template matching may be used.

Further, in the present embodiment, the calibration value for which in the calculation of the calibration value, a sum of squares of shortest distances between respective two rays is the smallest has been calculated. However, the disclosure is not limited thereto, and a configuration may be taken so as to project the feature points of the left image onto the right image via a midpoint of the closest points and search for a calibration value that minimizes a sum of square errors of all the pairs of feature points, taking differences between projected points and the coordinates of the feature points of the corresponding right image as errors. Further, in the present embodiment, left and right tilt with respect to the optical axis and offset shift have been estimated as the calibration value; however, the disclosure is not limited thereto. For example, a configuration may be taken so as to fix one side and estimate the other side's tilt with respect to the optical axis and offset shift and, in cases where magnification and focal length shift, estimate those parameters.

Further, in the present embodiment, camerawork is limited only to the forward movement component; however, the disclosure is not limited thereto, and for example, a configuration may be taken so as to estimate horizontal and vertical movement components and remove them from the three-dimensional coordinates. Further, in the present embodiment, the calculation of rotation uses a matrix; however, the disclosure is not limited thereto, and for example, a quaternion may be used.

Second Embodiment

In the following embodiments, which include the present embodiment, assume that differences from the first embodiment will be described and the rest is similar to the first embodiment unless otherwise mentioned below. In the present embodiment, three-dimensional points (projected start/end points) are obtained based on a disparity that is less than or equal to a threshold. The process of step S2050 according to the present embodiment will be described according to the flowchart of FIG. 5.

In step S5010, the CPU 105 obtains a disparity of a start point for each motion vector that is included in the optical flow (set of motion vectors) by performing a process that is similar to that of the above-described step S4010.

In step S5020, the CPU 105 obtains a disparity of an end point for each motion vector that is included in the optical flow (set of motion vectors) by performing a process similar to that of the above-described step S4020.

In step S5030, the CPU 105 obtains, as a target start point and a target end point, the start and end points of a motion vector for which both the disparity of the start point and the disparity of the end point are less than the threshold among the motion vectors that are included in the optical flow (set of the motion vectors). In the present embodiment, the threshold is assumed to be one pixel but is not limited thereto. In the present embodiment, when the disparity is less than the threshold, it is determined that the "disparity is 0".

The CPU 105 then projects (transforms) the respective coordinates of the target start and end points onto the coordinates on the surface of a sphere with the radius of 1 (into polar coordinates). The CPU 105 then generates a plurality of matrices M in a manner similar to that of the first embodiment and obtains the matrix e in a manner similar to that of the first embodiment from an equation that is obtained by replacing norm($p^3i$) with the "target start point that has been transformed into polar coordinates" and norm ($q'^3i$) with the "target end point that has been transformed into polar coordinates" in Equation (7).

In the first embodiment, the feature point coordinates were projected in a three-dimensional space. However, if the baseline length is unknown, the coordinates cannot be projected in a three-dimensional space. In the present embodiment, it is possible to calculate the shake that is not affected by the forward movement component by extracting a pair of feature points for which the disparity corresponds to 0 (i.e., can be regarded as being present at infinity) and calculating the shake component only from their movement. This is because it can be regarded that there is almost no forward movement component at infinity. By thus associating the left and right images, it is possible to calculate the shake component accurately without projection in a three-dimensional space.

Third Embodiment

In the first and second embodiments, the process that follows the flowchart has been described to be executed by the CPU 105; however, part or all of the process may be executed by the graphics processor 103. Further, the numbers of CPUs 105 and graphics processors 103 are not limited to one, and the image processing apparatus may include processors other than these. For example, the image processing apparatus may include hardware that is responsible for part of the process that follows the flowchart.

That is, in the image processing apparatus, the agent of the process is not limited to a particular agent, and the number of agents of the process is not limited to one; the form in which the process is executed is not limited to a particular form of execution, such as whether the process is executed in a single thread or multi-threads.

The feature point detection method that has been used in the first and second embodiments is one example, and other detection methods may be employed. Further, in the first and second embodiments, the calibration value is obtained in step S2010, and the shake amount of the stereo image is obtained with high accuracy, using the obtained calibration value. However, the calibration value that has been obtained in advance may be used, and in that case, the calibration value that has been obtained in advance is obtained in step S2010.

Further, if the state is such that the vertical shift between the left and right images of the stereo image is so small that it can be ignored, the process for obtaining the calibration value (i.e., the process of step S2010) may be omitted. In that case, the subsequent process will be executed without using the calibration value.

The numerical values; the processing timings; the processing order; the processing agents; the storage location, source, destination, and method of obtaining data (information); and the like that have been used in the above-described embodiments have been given as examples for the sake of concrete explanation and are not intended to be limited to such examples.

Further, some or all of the above-described embodiments may be used in combination as appropriate. Further, some or all of the above-described embodiments may be used selectively.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-001916, filed Jan. 10, 2023, which is hereby incorporated by reference herein in its entirety.

What is claimed is:

1. An image processing apparatus comprising:

one or more processors; and at least one memory coupled to the one or more processors storing instructions that, when executed by the one or more processors, cause the one or more processors to function as:

a first obtaining unit configured to obtain, based on an initial start point of a motion vector in one image of a stereo image and a point that corresponds to the initial start point in the other image of the stereo image, a first three-dimensional point that corresponds to the initial start point;

a second obtaining unit configured to obtain, based on an initial end point of the motion vector in the one image and a point that corresponds to the initial end point in the other image, a second three-dimensional point that corresponds to the initial end point;

a third obtaining unit configured to obtain, based on the first three-dimensional point and the second three-dimensional point, a third three-dimensional point for which a camerawork motion component has been removed from the second three-dimensional point and obtain, based on the third three-dimensional point and the first three-dimensional point, an amount of shake in the stereo image; and a fourth obtaining unit configured to obtain, based on a plurality of feature points in the one image and a plurality of feature points in the other image, a calibration value for correcting a vertical shift between the one image and the other image, wherein the first obtaining unit obtains the first three-dimensional point, further using the calibration value, wherein the first obtaining unit obtains a disparity based on the initial start point of a motion vector in the one image and a point that corresponds to the initial start point in the other image and obtains the first three-dimensional point based on the initial start point and the disparity, wherein the first obtaining unit obtains a disparity based on the initial end point of a motion vector in the one image and a point that corresponds to the initial end point in the other image and obtains the second three-dimensional point based on the initial end point and the disparity, wherein the second obtaining unit obtains the second three-dimensional point, further using the calibration value, and wherein the third obtaining unit obtains, as the amount of shake, a parameter that minimizes a value that is based on a difference between a three-dimensional point for which the first three-dimensional point has been normalized and a three-dimensional point for which a three-dimensional point for which the third three-dimensional point has been normalized has been transformed using that parameter.

2. The image processing apparatus according to claim 1, wherein the third obtaining unit obtains the camerawork motion component based on a difference between the first three-dimensional point and the second three-dimensional point.

3. The image processing apparatus according to claim 1, wherein the stereo image is an image of a respective frame of a moving image.

4. The image processing apparatus according to claim 1, further comprising:

an image capturing unit configured to capture the stereo image, wherein the first obtaining unit obtains the stereo image by using the image capturing unit.

5. An image processing apparatus comprising:

one or more processors; and at least one memory coupled to the one or more processors storing instructions that, when executed by the one or more processors, cause the one or more processors to function as:

a first obtaining unit configured to obtain, based on a first disparity that is based on an initial start point of a motion vector in one image of a stereo image and a point that corresponds to the initial start point in the other image of that the stereo image and a second disparity that is based on an initial end point of the motion vector in the one image and a point that corresponds to the initial end point in the other image, a final start point and a final end point;

a second obtaining unit configured to obtain, based on the final start point and the final end point, an amount of shake in the stereo image;

a third obtaining unit configured to obtain, based on a plurality of feature points in the one image and a plurality of feature points in the other image, a calibration value for correcting a vertical shift between the one image and the other image, wherein the first obtaining unit obtains the first three-dimensional point, further using the calibration value, wherein the first obtaining unit obtains a disparity based on the initial start point of a motion vector in the one image and a point that corresponds to the initial start point in the other image and obtains the first three-dimensional point based on the initial start point and the disparity, wherein the first obtaining unit obtains a disparity based on the initial end point of a motion vector in the one image and a point that corresponds to the initial end point in the other image and obtains the second three-dimensional point based on the initial end point and the disparity, and wherein the second obtaining unit obtains the second three-dimensional point, further using the calibration value, and wherein the second obtaining unit obtains, as the amount of shake, a parameter that minimizes a value that is based on a difference between a three-dimensional point that corresponds to the initial start point that has been obtained by the first obtaining unit and a three-dimensional point for which a three-dimensional point that corresponds to the initial end point that has been obtained by the first obtaining unit has been transformed using that parameter.

6. The image processing apparatus according to claim 5, wherein the first obtaining unit obtains the initial start point and the initial end point for which the first disparity and the second disparity are less than a threshold.

7. An image processing method that is performed by an image processing apparatus, the method comprising:

obtaining, based on an initial start point of a motion vector in one image of a stereo image and a point that corresponds to the initial start point in the other image of the stereo image, a first three-dimensional point that corresponds to the initial start point;

obtaining, based on an initial end point of the motion vector in the one image and a point that corresponds to the initial end point in the other image, a second three-dimensional point that corresponds to the initial end point;

obtaining, based on the first three-dimensional point and the second three-dimensional point, a third three-dimensional point for which a camerawork motion component has been removed from the second three-dimensional point and obtain, based on the third three-dimensional point and the first three-dimensional point, an amount of shake in the stereo image; and obtaining, based on a plurality of feature points in the one image and a plurality of feature points in the other image, a calibration value for correcting a vertical shift between the one image and the other image, where the obtaining obtains the first three-dimensional point, further using the calibration value, wherein the obtaining obtains a disparity based on the initial start point of a motion vector in the one image and a point that corresponds to the initial start point in the other image and obtains the first three-dimensional point based on the initial start point and the disparity, wherein the obtaining obtains a disparity based on the initial end point of a motion vector in the one image and a point that corresponds to the initial end point in the other image and obtains the second three-dimensional point based on the initial end point and the disparity, wherein the obtaining obtains the second three-dimensional point, further using the calibration value, and wherein the obtaining obtains, as the amount of shake, a parameter that minimizes a value that is based on a difference between a three-dimensional point for which the first three-dimensional point has been normalized and a three-dimensional point for which the third three-dimensional point has been normalized has been transformed using that parameter.

8. The image processing method according to claim 7, wherein the obtaining obtains the camerawork motion component based on a difference between the first three-dimensional point and the second three-dimensional point.

9. An image processing method that is performed by an image processing apparatus, the method comprising:

obtaining, based on a first disparity that is based on an initial start point of a motion vector in one image of a stereo image and a point that corresponds to the initial start point in the other image of the stereo image and a second disparity that is based on an initial end point of the motion vector in one image and a point that corresponds to the initial end point in the other image, a final start point and a final end point; and obtaining, based on the obtained start point and end point, an amount of shake in the stereo image;

obtaining, based on a plurality of feature points in the one image and a plurality of feature points in the other image, a calibration value for correcting a vertical shift between the one image and the other image, wherein the obtaining obtains the first three-dimensional point, further using the calibration value, wherein the obtaining obtains a disparity based on the initial start point of a motion vector in the one image and a point that corresponds to the initial start point in the other image and obtains the first three-dimensional point based on the initial start point and the disparity, wherein the obtaining obtains a disparity based on the initial end point of a motion vector in the one image and a point that corresponds to the initial end point in the other image and obtains the second three-dimensional point based on the initial end point and the disparity, wherein the obtaining obtains the second three-dimensional point, further using the calibration value, and wherein the obtaining obtains, as the amount of shake, a parameter that minimizes a value that is based on a difference between a three-dimensional point for which a first three-dimensional point has been normalized and a three-dimensional point for which a three-dimensional point for which a third three-dimensional point has been normalized has been transformed using that parameter.

10. A non-transitory computer-readable storage medium storing a computer program for causing a computer to function as:

a first obtaining unit configured to obtain, based on an initial start point of a motion vector in one image of a stereo image and a point that corresponds to the initial start point in the other image of the stereo image, a first three-dimensional point that corresponds to the initial start point;

a second obtaining unit configured to obtain, based on an initial end point of the motion vector in the one image and a point that corresponds to that end point in the other image, a second three-dimensional point that corresponds to the initial end point;

a third obtaining unit configured to obtain, based on the first three-dimensional point and the second three-dimensional point, a third three-dimensional point for which a camerawork motion component has been removed from the second three-dimensional point and obtain, based on the third three-dimensional point and the first three-dimensional point, an amount of shake in the stereo image; and a fourth obtaining unit configured to obtain, based on a plurality of feature points in the one image and a plurality of feature points in the other image, a calibration value for correcting a vertical shift between the one image and the other image, wherein the first obtaining unit obtains the first three-dimensional point, further using the calibration value, wherein the first obtaining unit obtains a disparity based on the initial start point of a motion vector in the one image and a point that corresponds to the initial start point in the other image and obtains the first three-dimensional point based on the initial start point and the disparity, wherein the first obtaining unit obtains a disparity based on the initial end point of a motion vector in the one image and a point that corresponds to the initial end point in the other image and obtains the second three-dimensional point based on the initial end point and the disparity, wherein the second obtaining unit obtains the second three-dimensional point, further using the calibration value, and wherein the third obtaining unit obtains, as the amount of shake, a parameter that minimizes a value that is based on a difference between a three-dimensional point for which the first three-dimensional point has been normalized and a three-dimensional point for which the third three-dimensional point has been normalized has been transformed using that parameter.

11. The non-transitory computer-readable storage medium according to claim 10, wherein the third obtaining unit obtains the camerawork motion component based on a difference between the first three-dimensional point and the second three-dimensional point.

12. A non-transitory computer-readable storage medium storing a computer program for causing a computer to function as:

a first obtaining unit configured to obtain, based on a first disparity that is based on an initial start point of a motion vector in one image of a stereo image and a point that corresponds to the initial start point in the other image of the stereo image and a second disparity that is based on an initial end point of the motion vector in one image and a point that corresponds to the initial end point in the other image, a final start point and a final end point;

a second obtaining unit configured to obtain, based on the final start point and the final end point, an amount of shake in the stereo image; and a third obtaining unit configured to obtain, based on a plurality of feature points in the one image and a plurality of feature points in the other image, a calibration value for correcting a vertical shift between the one image and the other image, wherein the first obtaining unit obtains the first three-dimensional point, further using the calibration value, wherein the first obtaining unit obtains a disparity based on the initial start point of a motion vector in the one image and a point that corresponds to the initial start point in the other image and obtains the first three-dimensional point based on the initial start point and the disparity, wherein the first obtaining unit obtains a disparity based on the initial end point of a motion vector in the one image and a point that corresponds to the initial end point in the other image and obtains the second three-dimensional point based on the initial end point and the disparity, wherein the second obtaining unit obtains the second three-dimensional point, further using the calibration value, and wherein the second obtaining unit obtains, as the amount of shake, a parameter that minimizes a value that is based on a difference between a three-dimensional point for which a first three-dimensional point has been normalized and a three-dimensional point for which a three-dimensional point for which a third three-dimensional point has been normalized has been transformed using that parameter.

* * * * *